United States Patent
Hirose

(10) Patent No.: US 7,260,177 B2
(45) Date of Patent: Aug. 21, 2007

(54) X-RAY INSPECTION APPARATUS

(75) Inventor: Osamu Hirose, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 11/379,375

(22) Filed: Apr. 19, 2006

(65) Prior Publication Data

US 2007/0025506 A1 Feb. 1, 2007

(30) Foreign Application Priority Data

Apr. 28, 2005 (JP) .............................. 2005/130819

(51) Int. Cl.
*G01N 23/04* (2006.01)

(52) U.S. Cl. ........................ 378/57; 378/58; 250/359.1; 382/141; 382/283

(58) Field of Classification Search ............. 378/57–59; 250/358.1, 359.1, 360.1; 382/100, 132, 141, 382/283

See application file for complete search history.

(56) References Cited

U.S. PATENT DOCUMENTS 3,917,947 A * 11/1975 Fenton .......................... 378/57

5,202,932 A * 4/1993 Cambier et al. ............ 382/142

FOREIGN PATENT DOCUMENTS

| JP | 63/236989 A | 10/1988 |
|----|-------------|---------|
| JP | 2001/281173 A | 10/2001 |

* cited by examiner

*Primary Examiner*—Jurie Yun
(74) *Attorney, Agent, or Firm*—Global IP Counselors, LLP

(57) ABSTRACT

An X-ray inspection apparatus is disclosed. An inside area defining unit defines an area inside the rim of the can in an X-ray image created by an image formation unit. An extension area defining unit rotates a circle such that the circle externally touches the above-mentioned area, and defines an extension area whose boundary is the locus of the center of the externally touching circle. A reduction area defining unit rotates a circle having the same radius such that it internally touches the extension area, and defines a reduction area whose boundary is the locus of the center of the internally touching circle. A mask area defining unit defines a region outside the boundary of the reduction area as a mask area, and the first contaminant detection unit performs an inspection for contamination in an inspection area inside the mask area defined by an inspection area defining unit.

5 Claims, 14 Drawing Sheets

(a)

(b)

(a)

(b)

(a)

↓ SMOOTHING (b)

X-RAY INSPECTION APPARATUS

CROSS-REFERENCE TO RELATED APPLICATIONS

This application claims priority to Japanese Patent Application No. 2005-130819. The entire disclosure of Japanese Patent Application No. 2005-130819 is hereby incorporated herein by reference.

BACKGROUND OF THE INVENTION

1. Field of the Invention

The present invention relates to an X-ray inspection apparatus that irradiates X-rays onto an object being conveyed and detects X-rays that are transmitted therethrough in order to inspect the object.

2. Background Information

Conventionally, inspection of defective products using an X-ray inspection apparatus has been performed in production lines for food and other products in order to avoid shipment of a defective product, such as a contaminated product or a product that is split or chipped. With this type of X-ray inspection apparatus, X-rays are irradiated onto objects that are conveyed continuously by a transport conveyor, the transmitted X-rays are detected by an X-ray receiving unit, and the presence of contaminants in the inspected objects is thereby determined.

With this type of X-ray inspection apparatus, in some cases, detection of contaminants is performed by defining a mask area in order to accurately detect contaminants in a product. For example, when inspecting for the presence of a contaminant in a product placed in a container such as a can, the rim of the can appears dark in an X-ray image, and so to does the image of a contaminant. Thus, it is difficult to accurately detect the image of a contaminant that is present near the rim of the can.

Japanese Patent Publication No. 2001-281173 (published on Oct. 10, 2001) discloses an X-ray inspection apparatus that accurately detects a contaminant that is present near the rim of a can by manually defining a mask area such that the number of pixels to be removed in the arrangement direction of the line sensor will be larger than the number of pixels to be removed in the direction perpendicular thereto. In addition, Japanese Patent Publication No. S63-236989 (published on Oct. 3, 1988) discloses an X-ray inspection apparatus that performs an inspection by defining mask areas according to the container and rim, and using a different threshold for each mask area.

However, the above-described conventional X-ray inspection apparatuses have the following problems.

Specifically, with both of the X-ray inspection apparatuses disclosed in the above publications, the mask area needs to be defined manually, which can be troublesome. In addition, when the mask area is defined at a deviated position, it causes problems such that the rim of a can or the like which has a higher density in an X-ray image created based on the amount of detected X-rays, will be erroneously determined as a contaminant.

In view of the above, it will be apparent to those skilled in the art from this disclosure that there exists a need for an improved an X-ray inspection apparatus capable of automatically defining an accurate mask area and accurately detecting contaminants that are present near the rim of a can and the like. This invention addresses this need in the art as well as other needs, which will become apparent to those skilled in the art from this disclosure.

SUMMARY OF THE INVENTION

An X-ray inspection apparatus according to a first aspect of the present invention is an X-ray inspection apparatus that irradiates X-rays onto an object in a container being conveyed, detects the amount of X-rays that are transmitted therethrough, and inspects whether or not a contaminant is present in the container. The X-ray inspection apparatus comprises an irradiation unit, an X-ray detection unit, an image formation unit, an inside area defining unit, an extension area defining unit, a reduction area defining unit, a mask area defining unit, an inspection area defining unit, and a first contaminant detection unit. The irradiation unit irradiates X-rays onto an object in a container. The X-ray detection unit detects the amount of transmitted X-rays that were irradiated by the irradiation unit onto the object in the container. The image formation unit creates an X-ray image based on the amount of transmitted X-rays, which is obtained by the X-ray detection unit for every line. The inside area defining unit defines an area inside a rim of the container within an area corresponding to the object in the container in the X-ray image created by the image formation unit. The extension area defining unit defines an extension area by rotating a circle having a predetermined radius such that the circle externally touches the inside area defined by the inside area defining unit and by using the locus of the center of this circle as a boundary of the extension area. The reduction area defining unit defines a reduction area by rotating a circle having a predetermined radius such that the circle internally touches the extension area defined by the extension area defining unit and by using the locus of the center of this circle as a boundary of the reduction area. The mask area defining unit defines the area outside the boundary of the reduction area defined by the reduction area defining unit as a mask area. The inspection area defining unit defines the area inside the mask area defined by the mask area defining unit as an inspection area. The first contaminant detection unit detects a contaminant in the inspection area defined by the inspection area defining unit.

Here, the extension area defining unit defines the extension area by rotating a circle having a predetermined radius such that the circle externally touches the area inside the rim of the container within the area corresponding to the object in the container in the X-ray image, whereas the reduction area defining unit defines the reduction area by rotating a circle having the same radius such that the circle internally touches the extension area. Then, the mask area defining unit defines the mask area by referring to the area outside the boundary of the reduction area as such, and the first contaminant detection unit inspects for the presence of a contaminant in the inspection area inside the mask area, which is defined by the inspection area defining unit.

Here, the object in the container includes, for example, a canned product and a boxed product. In addition, the area inside the container within the area corresponding to the object in the container refers to an area corresponding to the object in the container excluding a portion corresponding to the container.

As described above, the extension area is defined by rotating a circle having a predetermined radius such that the circle externally touches the area corresponding to the object in the container in the X-ray image, and the reduction area is defined by rotating a circle having the same radius internally along this extension area. By so doing, an area that substantially coincides with the area corresponding to the object in the original X-ray image can be defined as the reduction area, and the outer periphery of the area corresponding to the object can be smoothed out (smoothing).

For example, provided that the predetermined radius of the circle is 3 mm, a rough spot of about 1 to 2 mm in diameter that appears in an edge of the object in the X-ray image due to the influence of noise will be removed from the boundaries defined by the extension area defining unit and the reduction area defining unit.

Accordingly, without covering an area corresponding to a contaminant that is larger than a rough spot caused by noise near an outer peripheral portion of the object in the container (i.e., a portion corresponding to the container), the mask area for removing such a rough spot caused by noise in the outer peripheral portion can be automatically defined. Consequently, contaminants can be accurately detected. As a result, the inspection work can be efficiently performed, and highly precise detection of contaminants can be achieved, compared to the case where the mask area is manually defined in order to exclude the rim of the container from the inspection area.

An X-ray inspection apparatus according to a second aspect of the present invention is the X-ray inspection apparatus according to the first aspect of the present invention, wherein the X-ray inspection apparatus further comprises a second contaminant detection unit which rotates in a predetermined direction while tracing the boundary of the inspection area. When a portion is detected at which the direction of a vector pointing in a direction of movement changes in a direction opposite to the predetermined direction, the second contaminant detection unit determines this portion to be a contaminant.

Here, a contaminant that is present near the rim of the container, i.e., near a portion corresponding to the container, is detected in a step different from the step in which a contaminant that is present in the interior of the container is detected.

Specifically, an area (inspection area) inside the mask area defined by the mask area defining unit is subject to the detection of contaminants by the first contaminant detection unit, and an area near the boundary of the mask area is subject to the detection of contaminants by the second contaminant detection unit. The second contaminant detection unit rotates once in the predetermined direction as it traces internally along the boundary of the area inside the mask area. When there is a portion at which the direction of the vector changes in the direction opposite to the predetermined direction while tracing, this portion is determined to be a contaminant. For example, when the second contaminant detection unit rotates counterclockwise as it traces internally along the boundary portion of the area corresponding to the object in the X-ray image, it should return to the starting point of the rotation, still rotating in the same counterclockwise direction, if there are no rough spots or the like in the boundary portion. However, if there is a contaminant in the boundary portion, a rough spot will appear in the boundary portion. Accordingly, when the second contaminant detection unit passes through the boundary portion, there will be a portion at which the direction of the vector rotates clockwise.

Therefore, it is possible to accurately detect a contaminant that is present on the rim by detecting whether or not there is a portion at which the direction of the vector pointing in the direction of movement rotates clockwise as the second contaminant detection unit traces along the boundary portion of the inspection area.

An X-ray inspection apparatus according to a third aspect of the present invention is the X-ray inspection apparatus according to the second aspect of the present invention, wherein the second contaminant detection unit compares adjacent pixels from amongst the pixels that are present in the boundary of the inspection area in terms of the direction of the vector pointing in the direction of movement of the second contaminant detection unit. When the direction of the vector changes in the opposite direction in adjacent pixels, the second contaminant detection unit determines that the area of these pixels or a peripheral area including these pixels is a contaminant.

Here, among the pixels that the second contaminant detection unit passes through as it rotates along the pixels on the inner side of the boundary portion of the inspection area, the second contaminant detection unit compares adjacent pixels in terms of the direction of the vector pointing in the direction of movement as it passes through each pixel. When there is a portion at which the direction of the vector changes in the opposite direction in adjacent pixels, this portion (or a peripheral area including this portion) is determined to be a contaminant.

Typically, when the second contaminant detection unit rotates counterclockwise while tracing pixels on the inner side of the boundary portion of the area corresponding to the object in the container in the X-ray image, i.e., the inner side of the portion corresponding to the container, the second contaminant detection unit should return to the starting point of the rotation, while continuing to rotate in the same counterclockwise direction, if there are no rough spots or the like in the boundary portion. However, if a contaminant is present in the boundary portion, a rough spot will appear in the boundary portion. Accordingly, when the tracing passes through the boundary portion, there will be a portion at which it rotates clockwise.

Therefore, it is possible to accurately detect a contaminant that is present near the rim by detecting whether or not there is a pixel at which the direction of the vector pointing in the direction of movement changes in the opposite direction as the second contaminant detection unit traces internally along the boundary portion of the inspection area.

An X-ray inspection apparatus according to a fourth aspect of the present invention is the X-ray inspection apparatus according to the second aspect of the present invention, wherein the second contaminant detection unit compares adjacent pixels from amongst pixels that are present in the boundary of the inspection area in terms of the direction of the vector pointing in the direction of movement of the tracing. When the direction of the vector changes by 45 degrees or more at least two times in adjacent pixels, the second contaminant detection unit determines that area of these pixels or a peripheral area including these pixels is a contaminant.

Here, amongst the pixels that the second contaminant detection unit traces as it rotates in the predetermined direction internally along the boundary of the inspection area in order to detect a contaminant that is present in the boundary portion of the object, the second contaminant detection unit compares adjacent pixels in terms of the direction of the vector pointing in the direction of movement as it passes through each pixel. When there is a portion at which the direction of the vector changes by 45 degrees or more in adjacent pixels, this portion (or a peripheral area including this portion) is determined to be a contaminant.

Typically, when the second contaminant detection unit rotates counterclockwise internally along the boundary portion of the area corresponding to the object in the container in the X-ray image, i.e., the boundary of the portion corresponding to the container, it should return to the starting point of the rotation, while continuing to rotate in the same counterclockwise direction, if there are no rough spots or the like in the boundary portion. However, if there is a contaminant in the boundary portion, a rough spot will appear in the boundary portion. Accordingly, when the second contaminant detection unit passes through the boundary portion, there will be a portion at which the direction of the vector rotates clockwise 45 degrees or more. Here, the number of times the direction of the vector changes by 45 degrees or more is specified to be two. This is in order to prevent the erroneous determination of a rough spot and the like as a contaminant when it is actually not a contaminant, as the circle passes through such a portion.

Therefore, it is possible to more accurately detect a contaminant that is present near the rim, by detecting whether or not there is a portion at which the direction of the vector changes by 45 degrees or more in adjacent pixels among pixels on the inner side of the boundary of the inspection area.

An X-ray inspection apparatus according to a fifth aspect of the present invention is the X-ray inspection apparatus according to any one of the first through the fourth aspects, wherein the inside area defining unit defines the inside area based on a histogram of the density of each pixel included in the X-ray image.

Here, the inside area that provides an indication of the inspection area is defined by creating a histogram of the density of each pixel that forms the X-ray image, using the fact that the portion corresponding to the object in the X-ray image has a certain degree of density as the inside area defining unit defines the inside area.

For example, pixels brighter than a predetermined brightness threshold are removed in order to exclude the brightest background portion. Then, pixels darker than another predetermined threshold are also removed in order to exclude from the inside area the portion corresponding to the edge of the object in the container, i.e., the portion corresponding to the container, which appears darkest.

As a result, the inside area that has a certain degree of density can be accurately defined.

With the X-ray inspection apparatus according to the present invention, it is possible to automatically define a mask area that does not cover an area corresponding to a contaminant near an outer peripheral portion of an object in a container (portion corresponding to the container), and thus an accurate detection of contaminants can be performed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8($a$) is an image that is obtained by binarizing the X-ray image shown in FIG. 7($a$) based on a predetermined threshold, and FIG. 8($b$) shows which portions of the X-ray image the histogram shown in FIG. 7($b$) corresponds to.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

An X-ray inspection apparatus according to a selected embodiment of the present invention will now be described below with reference to FIGS. 1 to 13($c$).

Overall Configuration of X-ray Inspection Apparatus 10

Figure 1:
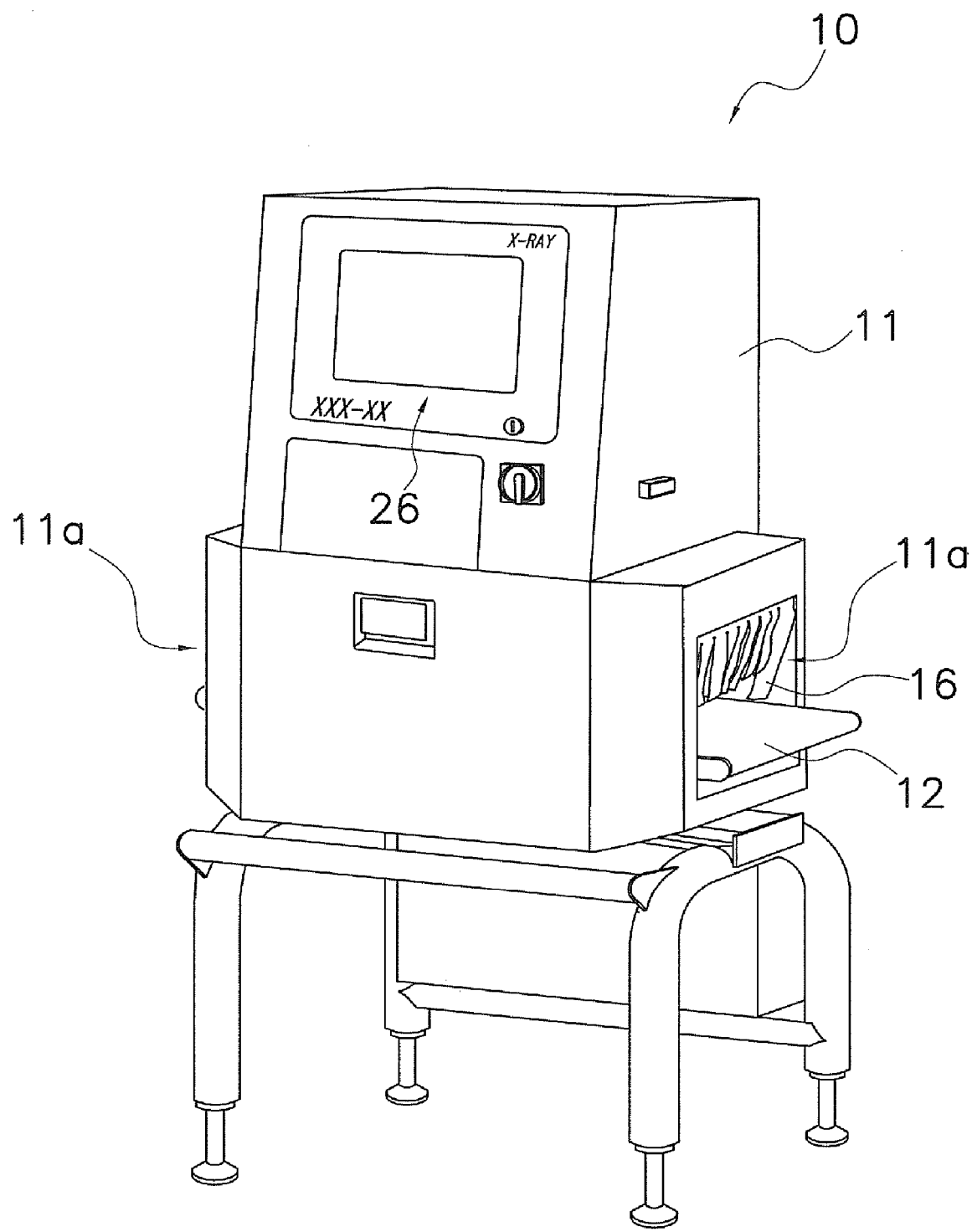
FIG. 1 is an external perspective view of an X-ray inspection apparatus according to an embodiment of the present invention.

As shown in FIG. 1, an X-ray inspection apparatus 10 in this embodiment is a type of apparatus by which a quality inspection is performed in product lines for food and other products. The X-ray inspection apparatus 10 irradiates X-rays onto products that are being conveyed continuously, detects the amount of X-rays that are transmitted therethrough, creates X-ray images based on the detected X-rays, and inspects whether or not there are contaminants in the products based on the X-ray images created.

Figure 2:
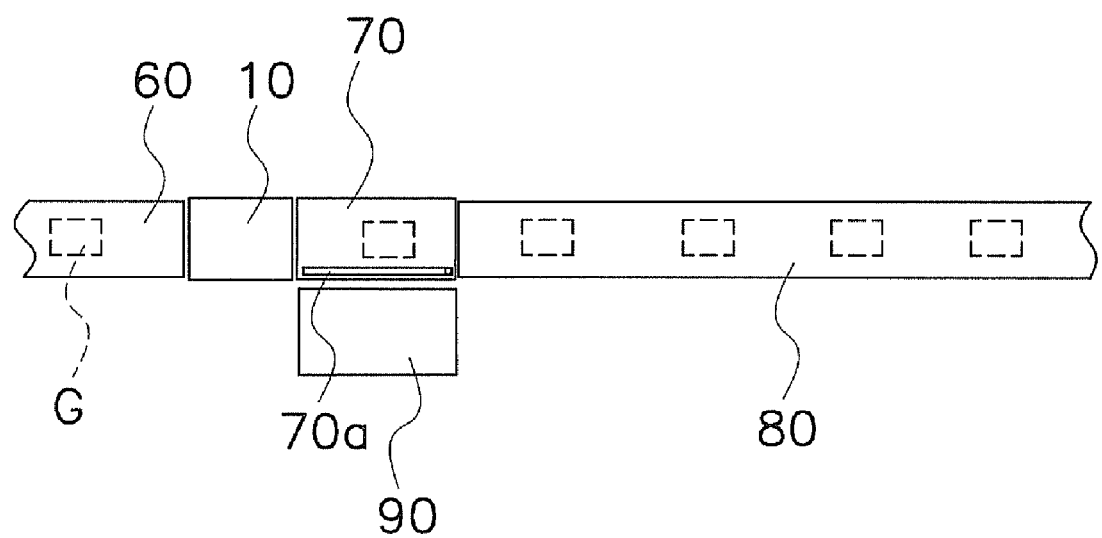
FIG. 2 is a block diagram showing the upstream and downstream portions of the X-ray inspection apparatus of FIG. 1.

As shown in FIG. 2, a product G, which is a product (an object in a container) to be inspected by the X-ray inspection apparatus 10, is conveyed by a front side conveyor unit 60 into the X-ray inspection apparatus 10. The X-ray inspection apparatus 10 determines the presence of a contaminant in the product G. The result of the determination by the X-ray inspection apparatus 10 is transmitted to a distribution mechanism 70 disposed on the downstream side of the X-ray inspection apparatus 10. The distribution mechanism 70 sends the product G as is to a regular line conveyor 80 when the product G is determined to be a non-defective product without contaminants by the X-ray inspection apparatus 10. On the other hand, when the product G is determined to be a defective product that contains contaminants by the X-ray inspection apparatus 10, an arm 70a rotates about the end portion on the downstream side as an axis of rotation so as to block the conveying path. In this way, the product G determined to be a defective product can be collected by a defect collection box 90 that is disposed at a position off the conveying path.

Figure 3:
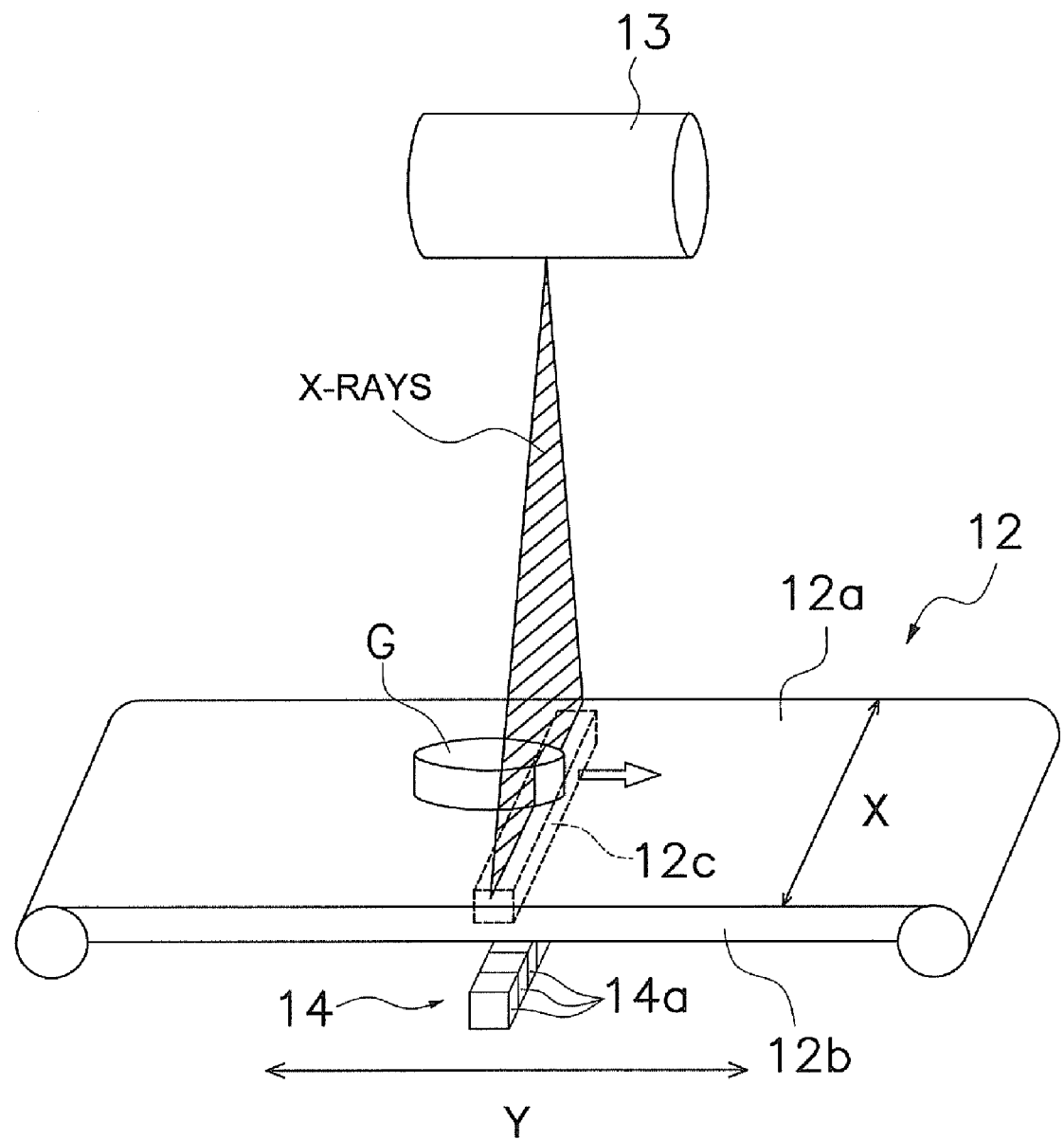
FIG. 3 is a simple schematic view showing the inside of a shield box of the X-ray inspection apparatus of FIG. 1.

As shown in FIG. 1, the X-ray inspection apparatus 10 mainly comprises a shield box 11, a conveyor unit 12, a shielding curtain 16, and a monitor 26 with a touch panel function. As shown in FIG. 3, provided inside the X-ray inspection apparatus 10 are an X-ray irradiator (irradiation unit) 13, an X-ray line sensor (X-ray detection unit) 14, and a control computer (image formation unit, inside area defining unit, extension area defining unit, reduction area defining unit, mask area defining unit, inspection area defining unit, first contaminant detection unit, second contaminant detection unit) 20 (refer to FIG. 5).

Note that the product G to be used as an inspection target in this embodiment is a sealed canned food product.

Shield Box 11

The shield box 11 has an opening 11a through which product G enters and exits. Housed inside this shield box 11 are the conveyor unit 12, the X-ray irradiator 13, the X-ray line sensor 14, the control computer 20, and the like.

In addition, as shown in FIG. 1, the opening 11a is covered by a shielding curtain 16 for preventing X-rays from leaking outside of the shield box 11. This shielding curtain 16 is partially made of rubber that contains lead, and is pushed away by the product when the product G is carried into and out from the shield box 11.

Further, the monitor 26, and other components such as a key hole and a power switch, are disposed on the upper front portion of the shield box 11.

Conveyor Unit 12

Figure 5:
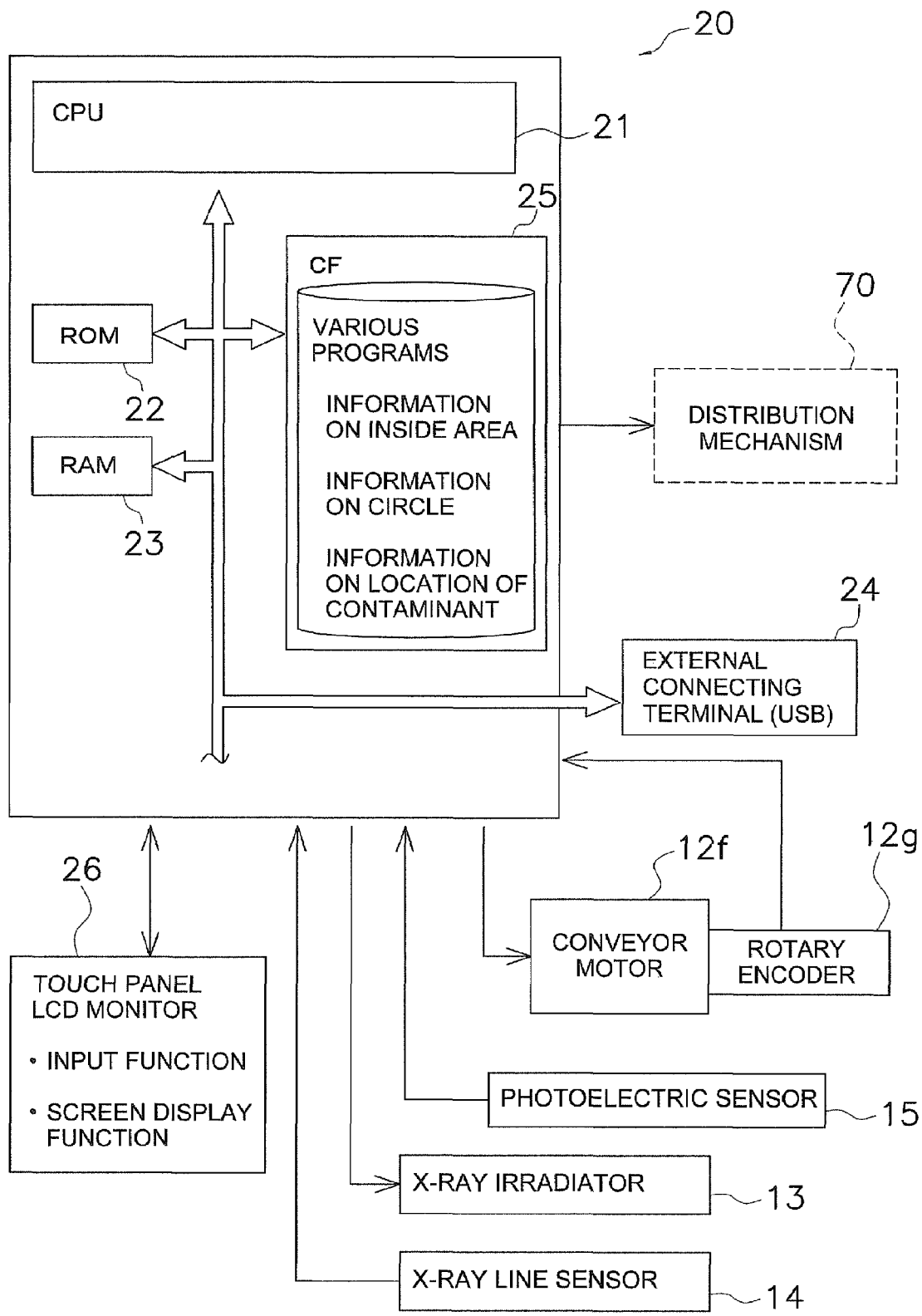
FIG. 5 is a control block diagram showing the configuration of a control computer included in the X-ray inspection apparatus of FIG. 1.

The conveyor unit 12 is configured to convey products inside the shield box 11, and is driven by a conveyor motor 12f included in the control block shown in FIG. 5. The conveyance speed of the conveyor unit 12 is controlled precisely through the inverter-control of the conveyor motor 12f by the control computer 20 so as to match the conveyance speed with the setting speed inputted by an operator.

In addition, as shown in FIG. 3, the conveyor unit 12 has a conveyor belt 12a and a conveyor frame 12b, and is removably attached to the shield box 11. Accordingly, the conveyor unit can be removed and washed frequently in order to keep the inside of the shield box 11 clean, in the case of inspecting food products and the like.

The conveyor belt 12a is an annular belt, and is supported by the conveyor frame 12b from an inner side of the belt. The conveyor belt 12a rotates by receiving the driving force of the conveyor motor 12f, and consequently conveys the object placed on the belt in a predetermined direction.

The conveyor frame 12b supports the conveyor belt 12a from the inner side of the annular belt. In addition, as shown in FIG. 3, the conveyor frame 12b has an opening portion 12c that opens lengthwise in a direction perpendicular to the conveying direction, at a position facing an inner surface of the conveyor belt 12a. The opening portion 12c is formed in the conveyor frame 12b, specifically at a position between the X-ray irradiator 13 and the X-ray line sensor 14 arranged in line. In other words, the opening portion 12c is formed at an X-ray irradiated area on the conveyor frame 12b where X-rays are irradiated by the X-ray irradiator 13, so that the X-rays that transmitted through the product G cannot be blocked by the conveyor frame 12b.

X-ray Irradiator 13

As shown in FIG. 3, the X-ray irradiator 13 is disposed above the conveyor unit 12, and irradiates X-rays in a fan shape toward the X-ray line sensor 14 disposed below the conveyor belt 12, via the opening portion 12c formed in the conveyor frame 12b (refer to the shaded area in FIG. 3).

X-ray Line Sensor 14

Figure 4:
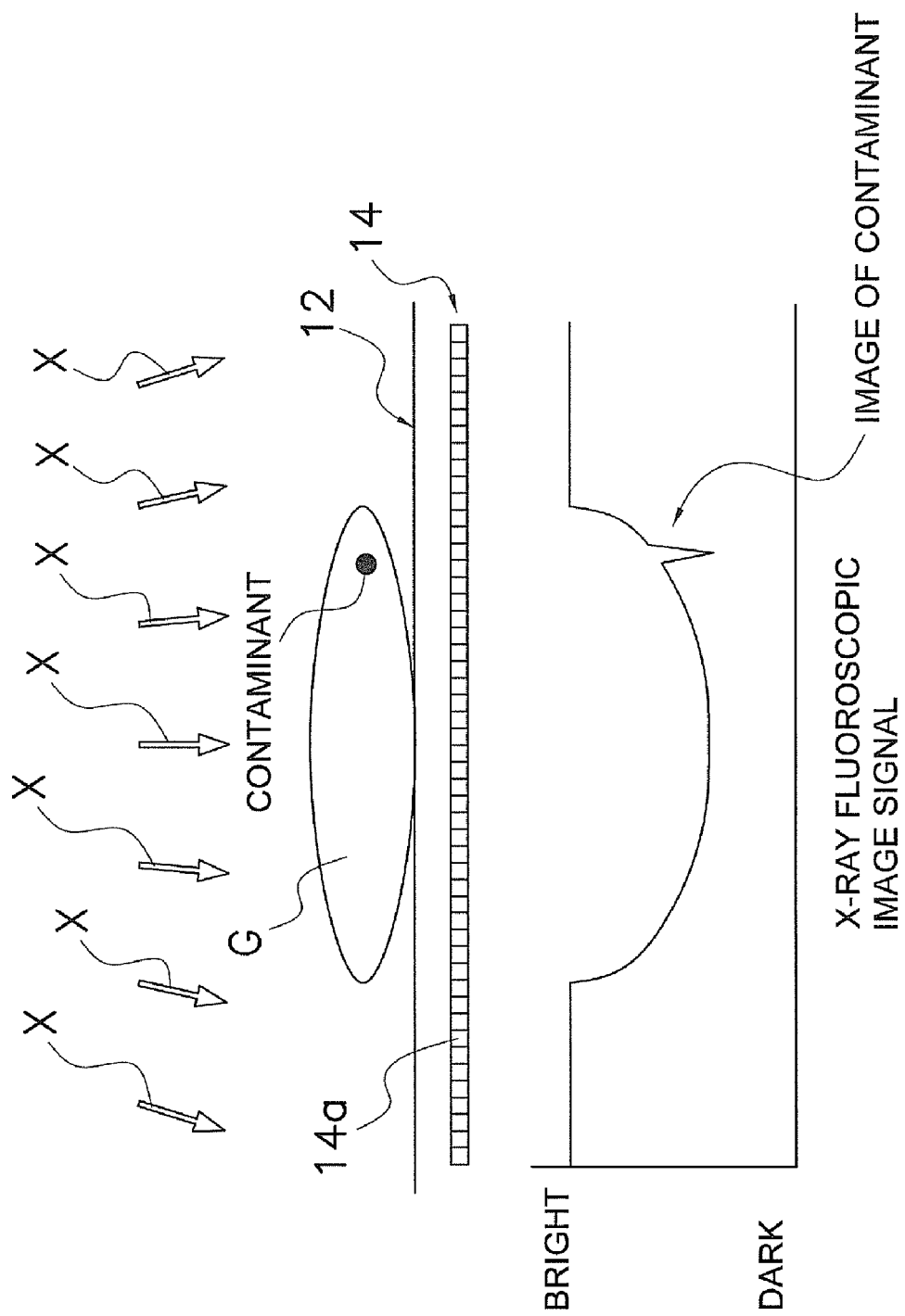
FIG. 4 is a schematic view showing the principle of inspection for contamination by the X-ray inspection apparatus of FIG. 1.

The X-ray line sensor 14 is disposed below the conveyor unit 12 (opening portion 12c), and detects X-rays that transmitted through the product G and the conveyor belt 12a. As shown in FIGS. 3 and 4, this X-ray line sensor 14 is configured from a plurality of pixels 14a that are horizontally disposed in a straight line in a direction perpendicular to the conveying direction of the conveyor unit 12.

Note that FIG. 4 shows a state in which X-rays are being irradiated inside the inspection apparatus 10, and it also shows a graph indicating the amount of X-rays that are detected in each pixel 14a that forms the line sensor 14.

Monitor 26

The monitor 26 is a full-dot matrix liquid crystal display. In addition, the monitor 26 is equipped with a touch panel function, and displays a screen that requests parameter input and the like regarding initial settings and defect determination.

Further, the monitor 26 displays an X-ray image which has undergone the image processes described below. Accordingly, a user is able to visually recognize the presence of a contaminant in the product G, its location, size, and the like.

Further, when a dark line is formed in an X-ray image because of an unstable amount of X-ray irradiation, which will be described later, the monitor 26 also displays X-ray images that correct the dark line portion. In addition, when an inspection cannot be performed because of an unstable amount of X-rays irradiated by the X-ray irradiator 13, the monitor 26 displays a message in accordance therewith.

Control Computer 20

The control computer 20 executes, in the CPU 21, routines included in a control program, such as an image process routine and an inspection and determination process routine. In addition, the control computer 20 stores and accumulates, in a memory unit such as a CF (Compact-Flash™) device 25, X-ray images corresponding to defective products, inspection results, data for correction of X-ray images, and the like.

As a specific configuration, as shown in FIG. 5, the control computer 20 is equipped with a CPU 21. The control computer 20 is also equipped with a ROM 22, a RAM 23, and the CF device 25 as main memory units to be controlled by the CPU 21.

The CF device 25 stores information regarding the following: an inside area in an X-ray image to be inspected for the presence of contaminants, which will be described later; a radius of a circle for smoothing out (smoothing) the boundary through an expansion process and a contraction process; the locations of contaminants detected in an inside area; the locations of contaminants detected near a rim, and the like.

Figure 6:
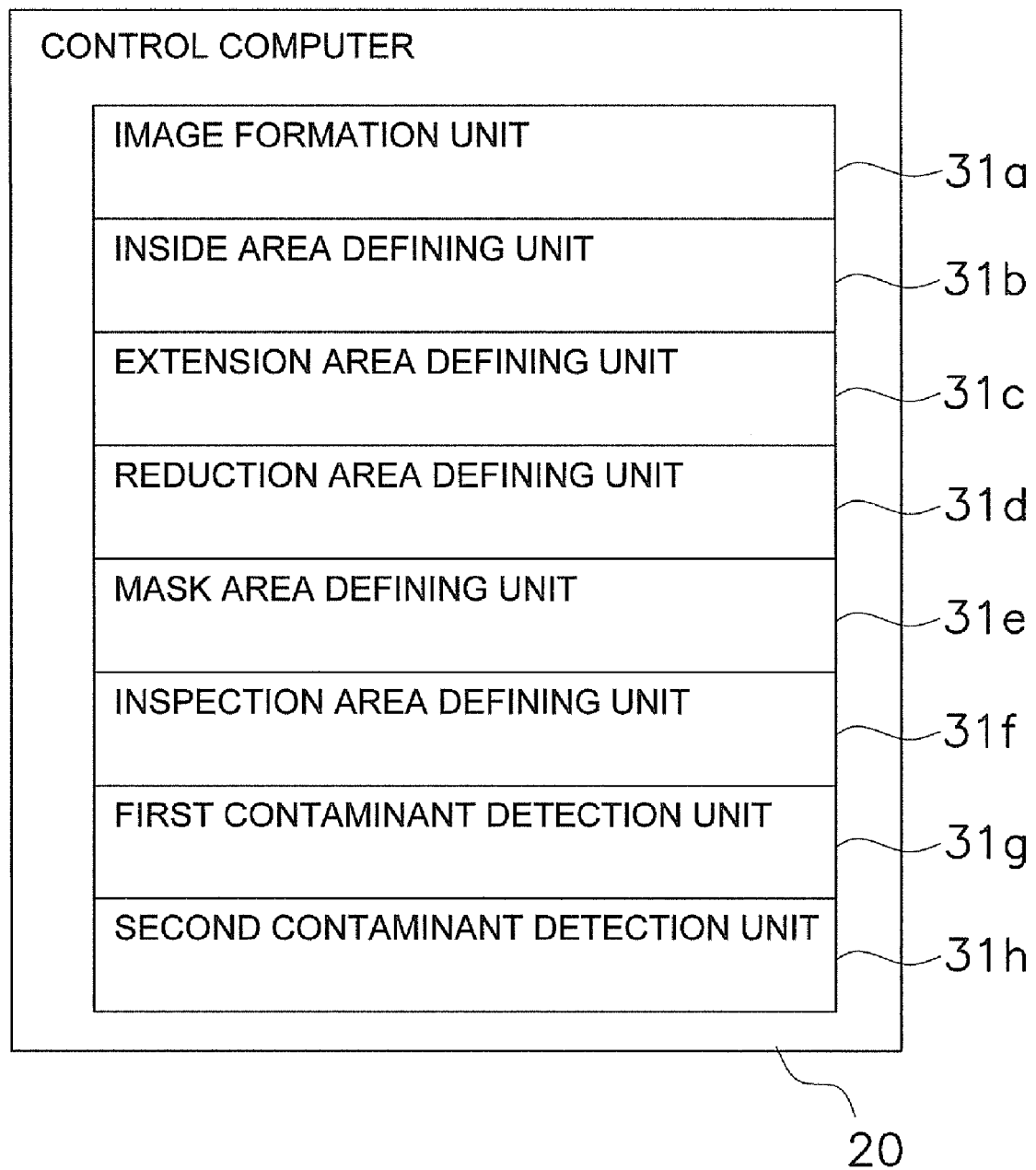
FIG. 6 is a diagram of function blocks that are formed by the control computer of FIG. 5.
Figure 7:
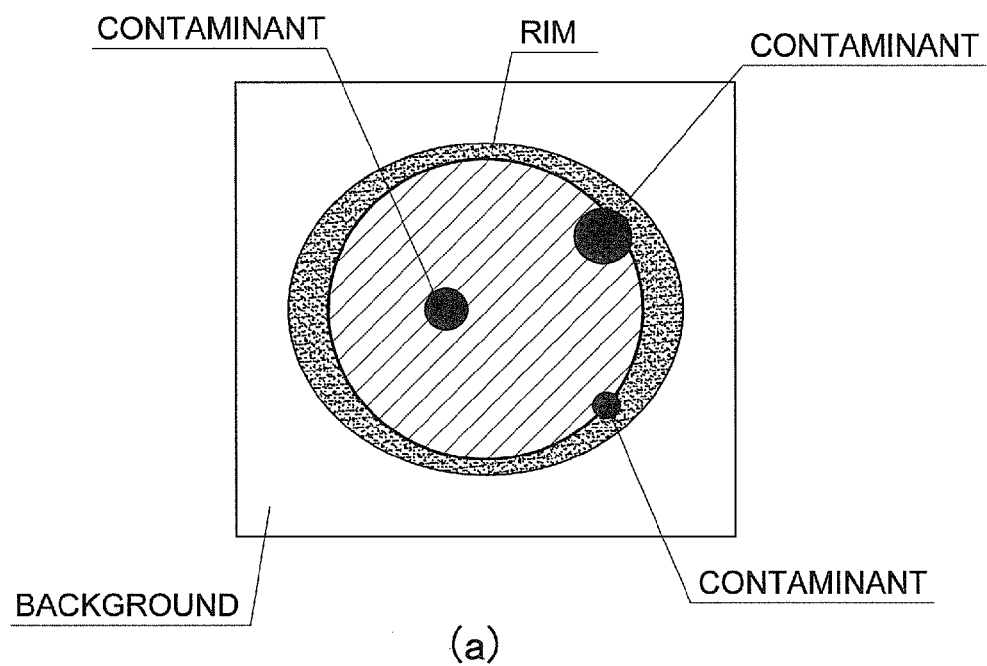
FIG. 7($a$) is an X-ray image created by the control computer of FIG. 1, and FIG. 7($b$) is a histogram that is created based on this X-ray image.
Figure 7:
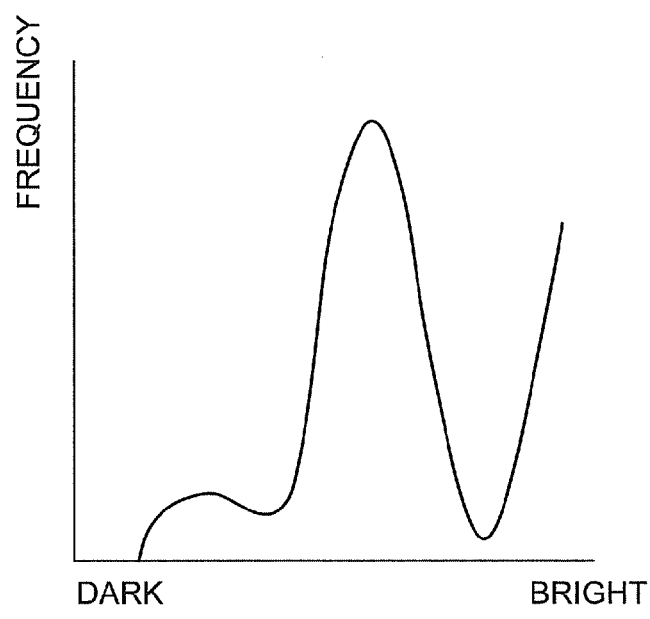
Figure 8:
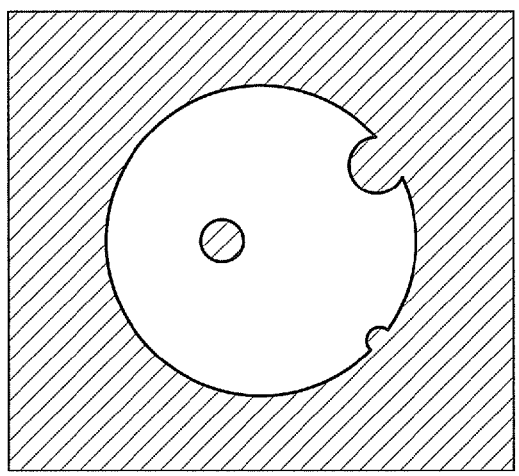
Figure 8:
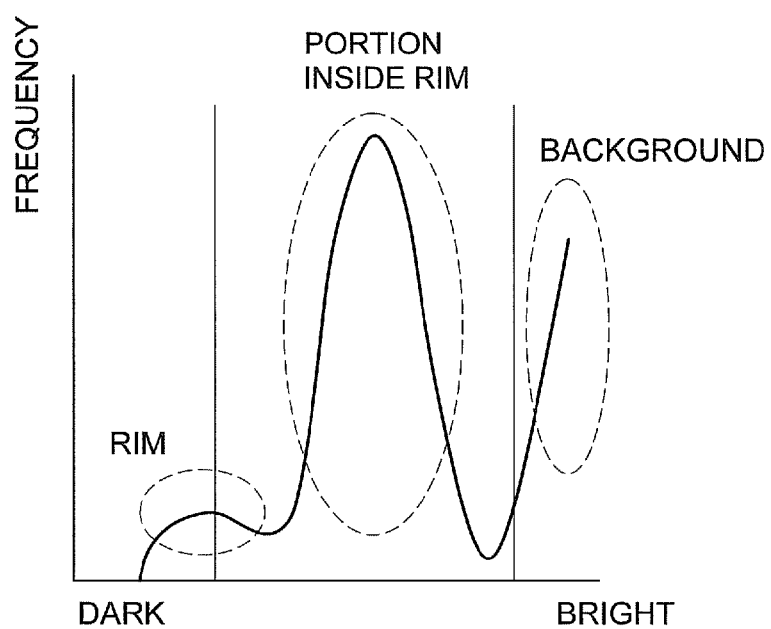
Figure 9:
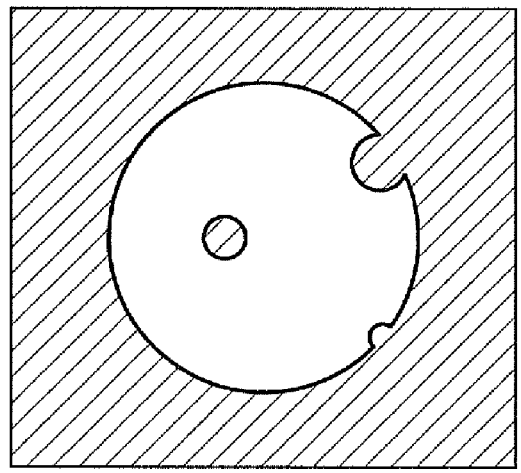
FIGS. 9($a$) and 9($b$) show before and after images of a contraction process performed on the binarized image shown in FIG. 8($a$).
Figure 9:
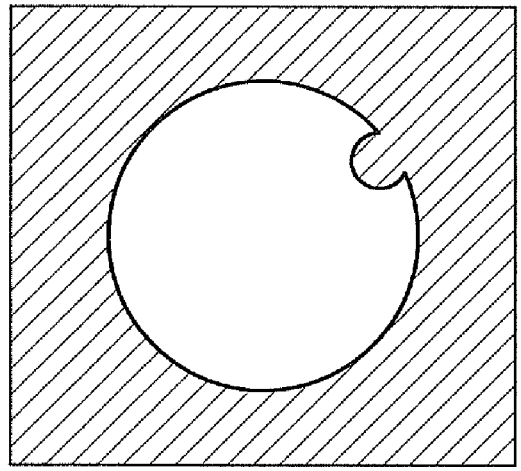
Figure 10:
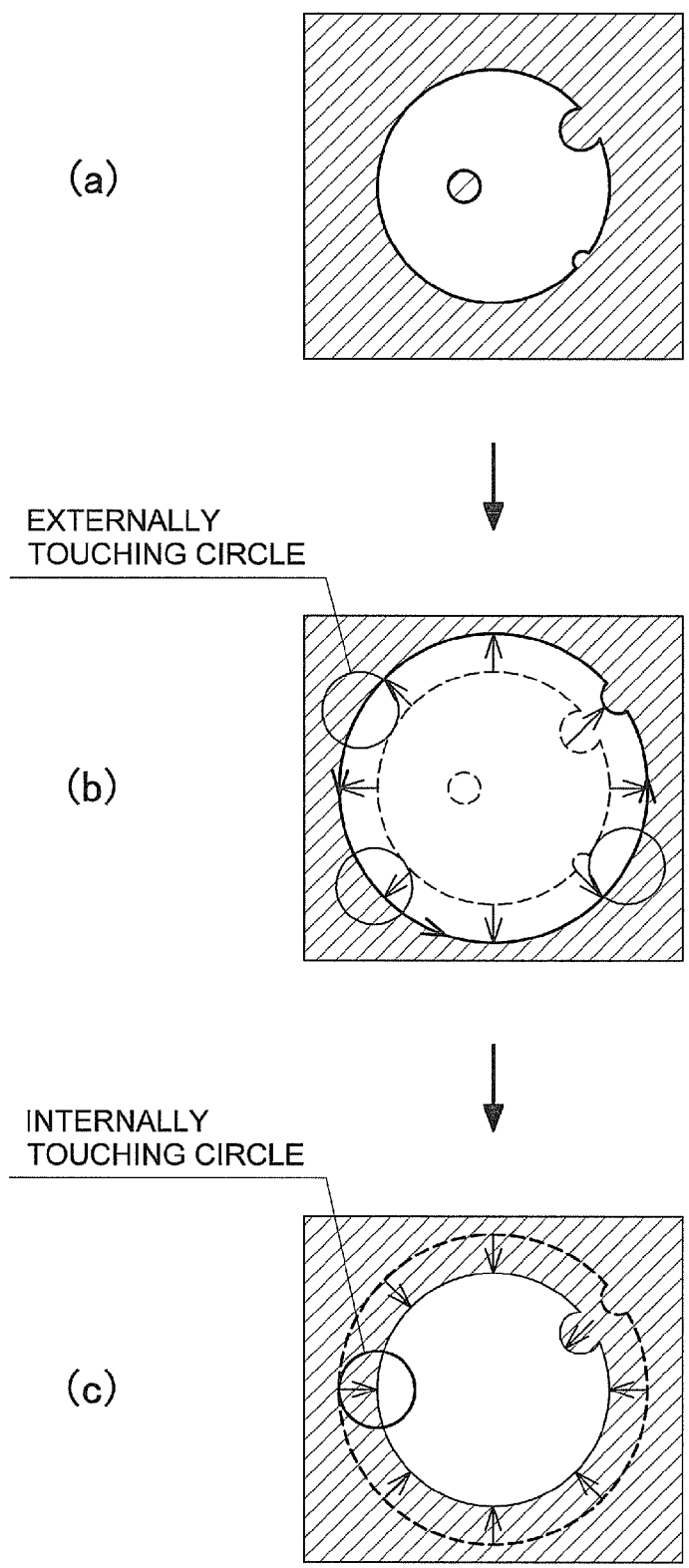
FIGS. 10($a$) to 10($c$) describe an expansion process and the contraction process to be performed on the binarized image shown in FIG. 8($a$).
Figure 11:
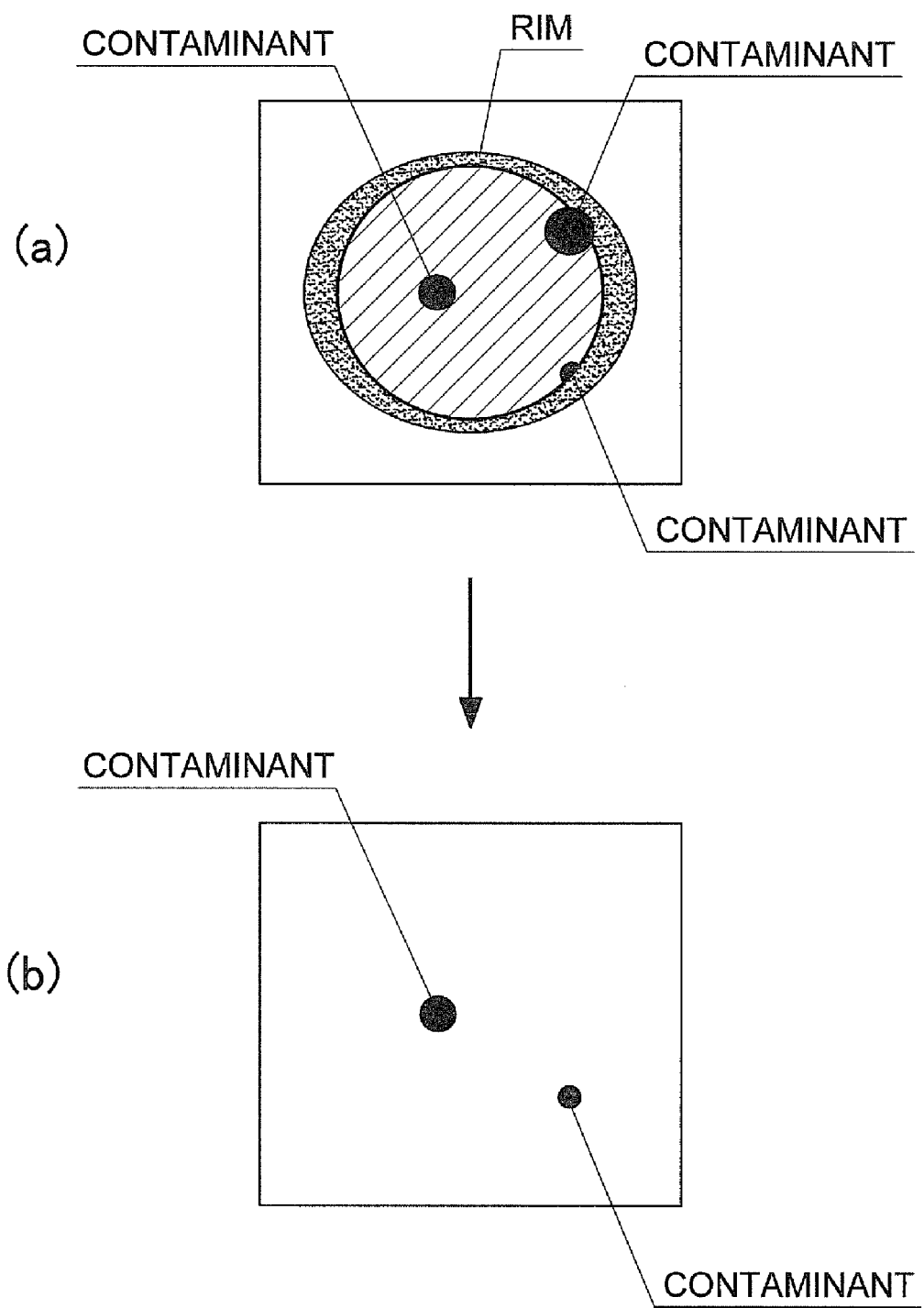
FIGS. 11($a$) and 11($b$) show the process of detection of contaminants in an inspection area.
Figure 12:
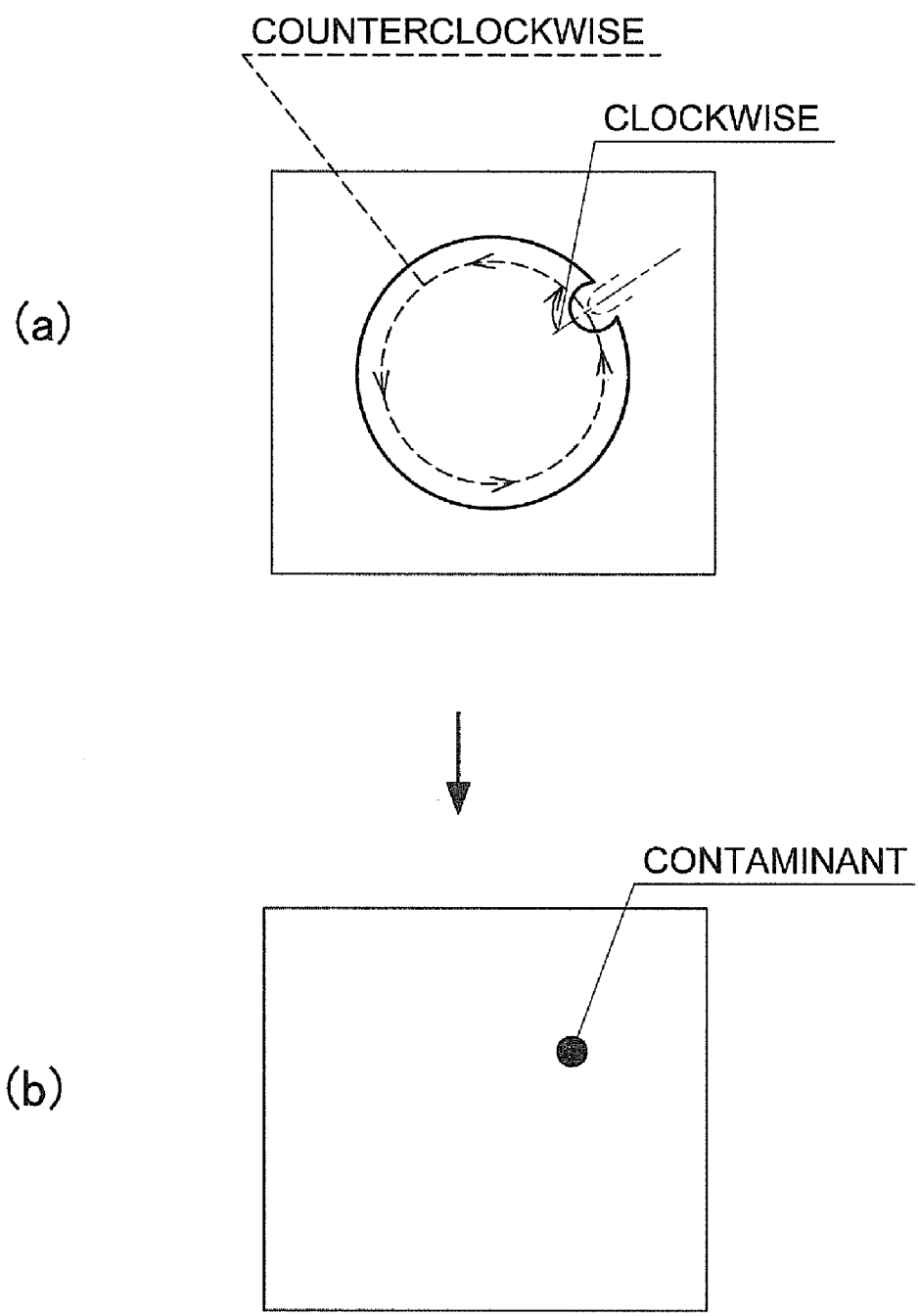
FIGS. 12($a$) and 12($b$) show the process of detection of contaminants on a rim.
Figure 13:
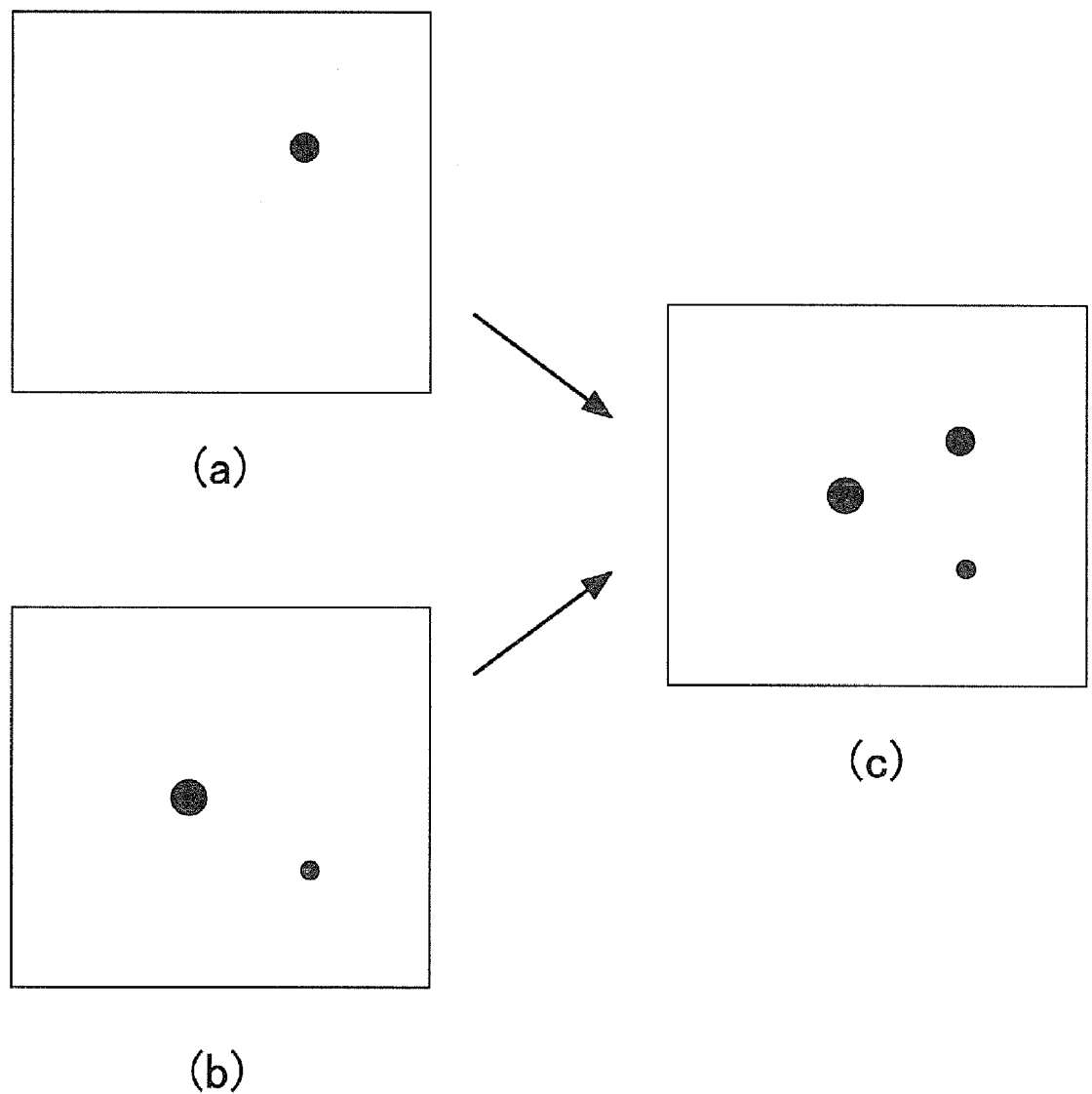
FIGS. 13($a$) to 13($c$) show a state in which images of contaminants shown in FIGS. 11 and 12 are combined, and detection of contaminants is completed.

In this embodiment, as the CPU 21 loads various programs stored in the memory units such as the CF device 25, function blocks as shown in FIG. 6 are formed, which include an image formation unit 31a, an inside area defining unit 31b, an extension area defining unit 31c, a reduction area defining unit 31d, a mask area defining unit 31e, an inspection area defining unit 31f, a first contaminant detection unit 31g, a second contaminant detection unit 31h, and the like.

The image formation unit 31a is a function block, which is formed as the CPU 21 loads an image forming program. The image formation unit 31a acquires X-ray fluoroscopic image signals at narrow time intervals from the X-ray line sensor 14, and creates an X-ray image that includes the product G and its background for every single line of the X-ray line sensor 14, based on the X-ray fluoroscopic image signals.

The inside area defining unit 31b is a function block, which is formed as the CPU 21 loads an inside area defining program, and which defines an inside area excluding a peripheral portion of the product G in the X-ray image created by the image formation unit 31a.

The extension area defining unit 31c is a function block, which is formed as the CPU 21 loads an extension area defining program, and which rotates a circle having a predetermined radius such that the circle externally touches the boundary of the inside area defined by the inside area defining unit 31b and expands the inside area in order to define an extension area.

The reduction area defining unit 31d is a function block, which is formed as the CPU 21 loads a reduction area defining program, and which rotates a circle having a predetermined radius such that the circle internally touches the extension area defined by the extension area defining unit 31c and reduces the extension area in order to define a reduction area. Note that the radius of the circles that the extension area defining unit 31c and the reduction area defining unit 31d use to define their areas is specified to be 3 mm in this example. Therefore, the reduction area is an area resulting from smoothing out the boundary portion of the inside area defined by the inside area defining unit 31b, and the reduction area and the inside area are generally the same size.

The mask area defining unit 31e is a function block, which is formed as the CPU 21 loads a mask area defining program, and which defines the area outside the reduction area in the X-ray image as a mask area.

The inspection area defining unit 31f is a function block, which is formed as the CPU 21 loads an inspection area defining program, and which defines the reduction area defined by the reduction area defining unit 31d as an inspection area.

The first contaminant detection unit 31g is a function block, which is formed as the CPU 21 loads a contaminant detection program, and which detects a contaminant in the inspection area (portion inside the container) defined by the inspection area defining unit 31f. A detection method that may be used here includes: one by which an X-ray image is binarized using the predetermined density of a pixel included in the X-ray image as a threshold in order to detect a pixel with a higher density than the predetermined density as a contaminant; and one by which the difference between the density of a certain pixel and the average density of pixels surrounding the certain pixel is determined in order to extract an isolated area with a higher density and consequently detect a contaminant.

The second contaminant detection unit 31h is a function block, which is formed as the CPU 21 loads a rim portion contaminant detection program, and which detects a contaminant that is present near the area outside of where detection of contaminants was performed by the first contaminant detection unit 31g, i.e., near a portion corresponding to the container. Note that a method for detecting a contaminant by the second contaminant detection unit 31h will be described later in detail.

In addition, the control computer 20 is equipped with a display control circuit that controls the display of data on the monitor 26, a key input circuit that retrieves key input data from the touch panel of the monitor 26, an I/O port for controlling data printing of a printer (not shown), a USB 24 as an external connecting terminal, and the like.

The memory units such as the CPU 21 device, the ROM device 22, the RAM device 23, and the CF device 25 are mutually connected via a bus line, such as an address bus and a data bus.

Further, the control computer 20 is connected to the conveyor motor 12f, a rotary encoder 12g, the X-ray irradiator 13, the X-ray line sensor 14, a photoelectric sensor 15, and other components.

The control computer 20 receives data concerning the conveyance speed of the conveyor unit 12, which is detected by the rotary encoder 12g mounted on the conveyor motor 12f.

In addition, the control computer 20 receives signals from the photoelectric sensor 15 serving as a synchronization sensor, which is configured from a light projecting device and its corresponding light receiving device disposed so as to sandwich the conveyor unit, and detects the timing at which the product G to be inspected reaches the position of the X-ray line sensor 14.

Determination of Contamination by Control Computer 20

Creation of an X-ray Image

The control computer 20 receives signals from the photoelectric sensor 15, and acquires X-ray fluoroscopic image signals at narrow time intervals from the X-ray line sensor 14 when the product G passes through the X-ray irradiated area in a fan-shape (refer to the shaded area in FIG. 3). Then, as the image formation unit 31a, the control computer 20 creates an X-ray image (refer to FIG. 7(a)) that includes the product G and its background portion for every single line of the X-ray line sensor 14, based on the X-ray fluoroscopic image signals. In other words, the image formation unit 31a acquires time-based data from each pixel 14a of the X-ray line sensor 14 at narrow time intervals, and then creates X-ray images based on respective data. Then, these X-ray images are combined in temporal order, and by so doing, a two-dimensional image at large, which includes the entirety of the product G and its background portion, is created.

Extraction of Inside Inspection Area

The control computer 20 first creates, as shown in FIG. 7(b), a histogram of the X-ray image shown in FIG. 7(a) for showing the shade of each pixel therein, in order to detect a contaminant in the contents of the can separately from a contaminant near the rim of the can. As shown in FIG. 7(a), the X-ray image on which this histogram is based mainly includes the following portions: the rim of the can of the canned product G, contaminants, the contents of the can, and the background. Accordingly, as shown in FIG. 8(b), based on the density of each pixel, the histogram shown in FIG. 7(b) is divided into the following portions: the rim of the can or contaminants, the portion inside the rim (the contents portion), and the background. Here, the control computer 20 extracts the contents portion of the can using two thresholds, in order to create a binarized image that defines the inside area to be inspected. Specifically, pixels that are within a specific density range are extracted using the following relational expression (1).

50% of the peak value in the histogram<range to be extracted<80% of the maximum brightness  (1)

In the above relational expression (1), "50% of the peak value in the histogram" is equivalent to dark pixels corresponding to the rim of the can or a contaminant, and "80% of the maximum brightness" is mainly equivalent to the background portion. Accordingly, it is possible to generate a binarized image as shown in FIG. 8(a) in which the contents portion of the can is extracted, by extracting pixels in a predetermined brightness range using the above relational expression.

Defining the Mask Area

With the X-ray inspection apparatus 10 in this embodiment, the mask area to be excluded from the inspection area is defined in the two-dimensional image formed by the control computer 20.

Expansion Process and Contraction Process

With the control computer 20, first, an expansion process and a contraction process are performed along an outer rim of the binarized image (refer to FIG. 9(a)) that was created based on the histogram showing the density of each pixel, in order to obtain an image as shown in FIG. 9(b), in which the rim and the portion inside the rim are smoothed out.

Such a smoothed-out image can be obtained by performing the expansion process and the contraction process on the binarized image.

The expansion process is performed by the control computer 20 rotating a circle having a radius of 3 mm externally along the rim of the binarized image shown in FIG. 10(a). As a result, as shown in FIG. 10(b), the locus of the center of the externally touching circle serves as a boundary of an extension area, in which a small rough spot of about 1 to 2 mm on the rim shown in FIG. 10(a) is smoothed out. This area is defined as the extension area by the control computer 20.

The contraction process is performed by the control computer 20 rotating a circle having a radius of 3 mm, which internally touches the boundary of the extension area shown in FIG. 10(b). As a result, as shown in FIG. 10(c), the locus of the center of the internally touching circle serves as a boundary of a reduction area, which is generally the same size as the original binarized image shown in FIG. 10(a), and in which a small rough spot on an outer peripheral rim and a blank spot inside are smoothed out. This area is defined as the reduction area by the control computer 20.

Then, in order to detect a contaminant in the contents of the can, the control computer 20 defines the area outside the reduction area shown in FIG. 10(c) as the mask area, which is obtained as a result of the contraction process.

Here, a contaminant that is present near the boundary portion cannot be entirely covered by the mask area that is defined as a result of smoothing out the boundary portion as described above.

Accordingly, it is possible to define the mask area that does not cover a relatively large contaminant that is present near the rim, while removing a rough spot that appears due to noise in the portion corresponding to the rim of the can. As a result, defining the mask area as described above consequently enables the area that includes contaminants that are present in the area inside the rim of the can and near the rim to be defined as the inspection area.

Defining the Inspection Area

The control computer 20 defines the inspection area inside the rim of the can (inspection area to be inspected by the first contaminant detection unit 31g) by covering the X-ray image shown in FIG. 11(a) with the mask area defined by the above-described expansion process and contraction process.

Detecting Contaminants

Detecting Contaminants in the Contents of a Can

As the first contaminant detection unit 31g, the control computer 20 inspects whether or not there is a contaminant in the inspection area inside the rim of the can, which is defined by covering the X-ray image with the mask area as described above.

As described above, a specific detection method that may be used here includes: one by which an X-ray image is binarized using a predetermined density of a pixel included in the X-ray image as a threshold in order to detect a pixel with a higher density than the predetermined density as a contaminant; and one by which differential processing is performed so that the difference between the density of a certain pixel and the average density of pixels surrounding the certain pixel is determined in order to extract an isolated area with a higher density and consequently detect a contaminant.

Using such a method, it is possible to detect relatively large contaminants located in the can (the portion inside the rim of the can) and near the rim of the can as shown in FIG. 11(b).

Detecting Contaminants Near the Rim of a Can

In this embodiment, the control computer 20 divides an area to be inspected into the above-described area inside the can and a later-described rim area of the can in order to separately perform detection of contaminants. This is because there is a possibility that a contaminant that is present near the rim of the can may be covered by the mask area, excluding from the inspection area a portion where a contaminant is present, when the mask area is defined as described above.

Specifically, as the second contaminant detection unit 31h, as shown in FIG. 12(a), the control computer 20 rotates counterclockwise and traces pixels on the inner side of the boundary of the inspection area, and when there is a pixel at which the direction of the vector pointing in the direction of movement rotates clockwise, a portion corresponding to this pixel is determined to be a contaminant.

Here, if there are no rough spots corresponding to contaminants and the like in the boundary portion shown in FIG. 12(a), when the second contaminant detection unit 31h rotates counterclockwise and traces along the boundary portion of the inspection area, it will return to the starting point, still rotating in the same counterclockwise direction. On the other hand, since a contaminant that should be detected here is a contaminant that is present near the rim of the can, such a contaminant is present in contact with or near the rim of the can, i.e., near the boundary portion shown in FIG. 12(a). Accordingly, if there is a rough spot corresponding to a contaminant and the like on the rim, there will be a portion (pixel) at which the direction of the vector pointing in the direction of movement rotates clockwise (refer to the dotted line in FIG. 12(a)) in the course of the counterclockwise rotation from the starting point back to the same starting point.

This embodiment focuses on the change in the direction of the vector pointing in the direction of movement as the second contaminant detection unit 31h traces internally along the boundary portion of the inspection area as described above. Accordingly, the detection of a contaminant that is present near the rim of the can is performed by detecting the presence of a portion at which the original direction of the rotation changes to the opposite direction, i.e., the clockwise direction.

Consequently, it is possible to highly precisely detect a contaminant that is present near the rim of the can as shown in FIG. 12(b).

Composite Image of Contaminants

With the X-ray inspection apparatus 10 in this embodiment, as described above, detection of contaminants is performed separately for the area inside the rim of the can and for the rim area of the can. In other words, detection of contaminants is performed separately by the first contaminant detection unit 31g that detects contaminants in the area inside the can, and by the second contaminant detection unit 31h that detects contaminants that are present near the rim of the can.

Consequently, as shown in FIGS. 13(a) to 13(c), an image of a contaminant detected in the rim area of the can as shown in FIG. 13(a) and an image of contaminants detected in the area inside the rim of the can as shown in FIG. 13(b) are combined together as an image of the contaminants detected in one product G. This composite image of the contaminants as shown in FIG. 13(c) is used as a final image for determination.

Characteristics of X-ray Inspection Apparatus 10

(1) The X-ray inspection apparatus 10 in this embodiment is an inspection apparatus that performs an inspection for the presence of contaminants in the canned product G. As shown in FIG. 6, the X-ray inspection apparatus 10 has the control computer 20 that houses the following units formed as the function blocks: the image formation unit 31a, the inside area defining unit 31b, the extension area defining unit 31c, the reduction area defining unit 31d, the mask area defining unit 31e, the inspection area defining unit 31f, and the first contaminant detection unit 31g. With the control computer 20, the inside area defining unit 31b defines the area inside the rim of the can in the X-ray image created by the image formation unit 31a. Then, the extension area defining unit 31c rotates a circle having a radius of 3 mm such that the circle externally touches this inside area to define the extension area whose boundary is formed by the locus of the center of this externally touching circle; whereas the reduction area defining unit 31d rotates a circle having the same radius such that the circle internally touches this extension area to define the reduction area whose boundary is formed by the locus of the center of this internally touching circle. Subsequently, the mask area defining unit 31e defines as the mask area the area outside the boundary of the reduction area, and the first contaminant detection unit 31g performs an inspection for the presence of contaminants in the inspection area inside the mask area that is defined by the inspection area defining unit 31f.

In this way, by rotating a circle such that it touches the boundary portion and defining the inspection area based on the locus of this center of the circle, it is possible to automatically define the mask area in which the rim of the can is excluded. As a result, it is possible to remove from an inspection target a rough spot and the like that appear because of noise in the outer peripheral portion of the area inside the rim of the can, and a highly precise detection of contaminants can be performed. Further, by smoothing out the outer peripheral portion, it is possible to exclude from the mask area a relatively large contaminant that is present on the rim of the can, and detect such a contaminant when performing detection of contaminants that are present in the area inside the rim of the can.

As a result, compared to a conventional X-ray inspection apparatus in which a mask area is manually defined, a highly accurate inspection for contamination can be efficiently performed.

(2) With the X-ray inspection apparatus 10 in this embodiment, as shown in FIG. 6, the control computer 20 further has the second contaminant detection unit 31h formed therein. Further, the second contaminant detection unit 31h performs detection of contaminants in the area that corresponds to the rim of the can separately from contaminants in the inside area. Specifically, as shown in FIG. 12(a), the second contaminant detection unit 31h traces pixels on the inner side of the boundary portion of the inspection area, and if there is a portion at which the direction of the vector pointing in the direction of movement rotates clockwise while tracing, in the course of the counterclockwise rotation from the starting point back to the same starting point, this portion is determined as a contaminant.

In this way, even when a contaminant that is present near the rim is covered by the mask area defined for the purpose of inspecting the inside area, and the contaminant is consequently excluded from the inspection area, it is still possible to highly precisely detect such a contaminant that is present near the rim by performing an inspection separately for the area inside the rim of the can and for the rim.

(3) With the X-ray inspection apparatus 10 in this embodiment, among the pixels that the second contaminant detection unit 31h passes through as it traces along the boundary of the inspection area, the second contaminant detection unit 31h compares adjacent pixels in terms of the direction of the vector pointing in the direction of movement, when performing determination of contamination. When there is a pixel at which the direction of the vector changes in the opposite direction, the portion corresponding to this pixel is determined as a contaminant.

Accordingly, it is possible to identify the presence of a contaminant for each pixel and perform a highly precise detection of contaminants that are present near the rim of the can.

(4) With the X-ray inspection apparatus 10 in this embodiment, when defining the area inside the rim of the can, the inside area defining unit 31b creates a histogram based on the density of each pixel included in the X-ray image, as shown in FIG. 7(a) to FIG. 8(b). Then, the inside area defining unit 31b establishes predetermined thresholds for this histogram, creates a binarized image, and defines the inside area.

As a result, pixels brighter than a predetermined brightness threshold are removed in order to exclude the brightest background portion, and pixels darker than another predetermined threshold are also removed in order to exclude from the inside area the rim of the container with the object inside, i.e., the portion corresponding to the container, which appears darkest. In this way, an inside area having a certain degree of density can be accurately defined.

OTHER EMBODIMENTS

While a selected embodiment of the present invention has been described hereinbefore, it will be apparent that the present invention is not limited thereto and various changes and modifications can be made herein without departing from the scope of the invention.

(A) In the above embodiment, an example was described in which the second contaminant detection unit 31h rotates as it traces pixels immediately inside the boundary of the inspection area when detecting a contaminant that is present near the rim of the can, and determines the presence of a contaminant depending whether or not there is a portion at which the direction of the vector pointing in the direction of movement changes while rotating. However, the present invention is not limited thereto.

Figure 14:
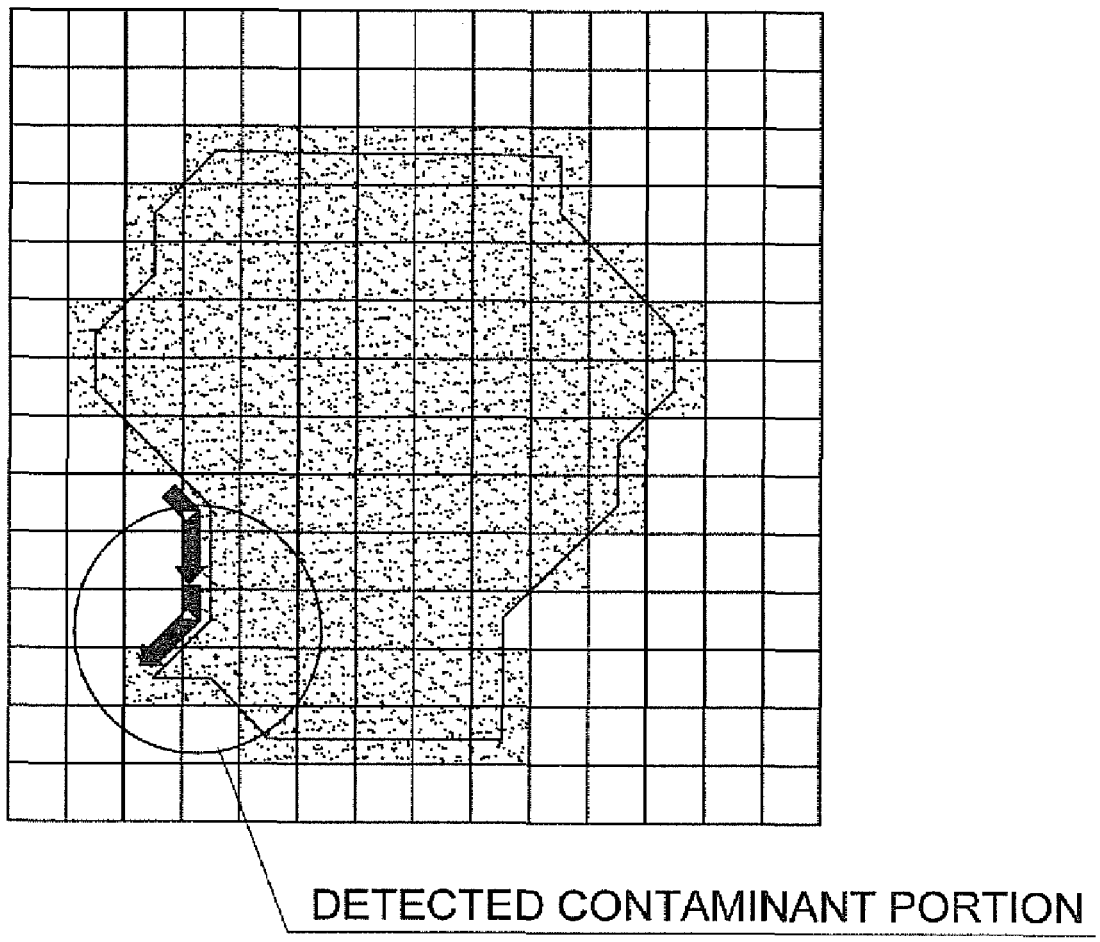
FIG. 14 describes a method for determination used when detecting a contaminant near a rim of a can by an X-ray inspection apparatus according to another embodiment of the present invention.

For example, as shown in FIG. 14, when a vector pointing in the direction of movement of the locus of the externally touching circle changes by 45 degrees or more at least two times consecutively in adjacent pixels among pixels that are present immediately inside the boundary of the inspection area, a portion corresponding to these pixels may be determined to be a contaminant.

In such a case, it is possible to avoid erroneously determining a small rough spot that is present on the rim to be a contaminant, and consequently, more highly precise detection of contaminants can be performed.

(B) In the above embodiment, an example was described in which the second contaminant detection unit 31h rotates as it traces pixels immediately inside the boundary of the inspection area when detecting a contaminant that is present near the rim of the can, and when there is a pixel at which the direction of the vector pointing in the direction of movement changes while rotating, a portion corresponding to this pixel is determined to be a contaminant. However, the present invention is not limited thereto.

For example, when there is a portion at which the above-mentioned direction of the vector changes in adjacent pixels, a portion corresponding to these pixels and their peripheral area (for example, 3×3 pixel area) may be determined as a contaminant. Accordingly, it is possible to clearly indicate the presence of a contaminant in the image.

(C) In the above embodiment, an example was described in which the circle to be rotated for the expansion and contraction processes has a radius of 3 mm. However, the present invention is not limited thereto.

For example, depending on factors such as the size of a contaminant that is present in the product G and the size of the product G, a circle having a radius of 2 mm or less or a radius of 4 mm or more may be rotated.

Note that it is more preferable that the radius of the circle to be rotated in this way can be changed by a user as needed by changing a setting.

(D) In the above embodiment, an example was described in which inspection for contamination is performed on the product G placed in a can having a circular cross section. However, the present invention is not limited thereto.

The shape of the cross section of the can or the container is not limited to a circular shape. For example, a can or a container having a quadrilateral cross section or triangular cross section may be used. In such a case, detection of contaminants by the second contaminant detection unit 31h is performed by determining whether or not it returns to the starting point by moving in a straight line and turning to the left. When there is a portion at which the second contaminant detection unit 31h turns to the right, this portion can be determined to be a contaminant.

(E) In the above embodiment, the X-ray inspection apparatus that determines the presence of a contaminant in the object in the can was described as an example. However, the present invention is not limited thereto.

For example, it may be an X-ray inspection apparatus that inspects an object that is not placed in a container. In this case also, a contaminant that is present at an outer edge portion of the object can be accurately determined.

Since the X-ray inspection apparatus of the present invention achieves an effect of accurately detecting a contaminant that is present near the rim of a container and the like, it is more particularly and widely applicable to various inspection apparatuses that perform inspections for contamination in a product placed in a container such as a can.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An X-ray inspection apparatus that irradiates X-rays onto an object in a container to be conveyed, detects the amount of X-rays transmitted therethrough, and determines whether or not there is a contaminant in the container, the X-ray inspection apparatus comprising:

an irradiation unit configured to irradiate X-rays onto the object in the container;

an X-ray detection unit configured to detect the amount of X-rays that are irradiated onto the object in the container by the irradiation unit;

an image formation unit configured to create an X-ray image based on the amount of X-rays detected by the X-ray detection unit;

an inside area defining unit configured to define an area inside the rim of the container within an area corresponding to the object in the container in the X-ray image created by the image formation unit;

an extension area defining unit configured to rotate a circle having a predetermined radius such that the circle externally touches the inside area defined by the inside area defining unit in order to define an extension area that uses the locus of the center of the circle as a boundary of the extension area;

a reduction area defining unit configured to rotate a circle having a predetermined radius such that the circle internally touches the extension area defined by the extension area defining unit in order to define a reduction area that uses the locus of the center of this circle as a boundary of the reduction area;

a mask area defining unit configured to define an area outside the boundary of the reduction area defined by the reduction area defining unit as a mask area;

an inspection area defining unit configured to define an area inside the mask area defined by the mask area defining unit as an inspection area; and a first contaminant detection unit configured to detect a contaminant in the inspection area defined by the inspection area defining unit.

2. The X-ray inspection apparatus according to claim 1, further comprising a second contaminant detection unit configured to rotate in a predetermined direction while tracing the boundary of the inspection area, detect a portion at which the direction of a vector pointing in a direction of movement changes in a direction opposite to the predetermined direction, and determine the detected portion as a contaminant.

3. The X-ray inspection apparatus according to claim 2, wherein the second contaminant detection unit is configured to compare adjacent pixels amongst the pixels that are present in the boundary of the inspection area in terms of the direction of the vector pointing in a direction of movement, and when the direction of the vector changes in an opposite direction in adjacent pixels, the second contaminant detection unit will determine the area of these pixels or a peripheral area including these pixel to be a contaminant.

4. The X-ray inspection apparatus according to claim 2, wherein the second contaminant detection unit is configured to compare adjacent pixels amongst the pixels that are present in the boundary of the inspection area in terms of the direction of the vector pointing in a direction of movement, and when the direction of the vector changes by 45 degrees or more at least two times in adjacent pixels, the second contaminant detection unit will determine the area of these pixels or a peripheral area including these pixels to be a contaminant.

5. The X-ray inspection apparatus according to claim 1, wherein the inside area defining unit is configured to define the inside area based on a histogram of the density of each pixel included in the X-ray image.

* * * * *